US006455082B1

(12) United States Patent
Sher et al.

(10) Patent No.: US 6,455,082 B1
(45) Date of Patent: *Sep. 24, 2002

(54) SHELF-STABLE CALCIUM FORTIFIED MILK AND DAIRY PRODUCTS

(75) Inventors: Alexander Sher, Rockville, MD (US); Chandrasekhara Reddy Mallangi, New Milford, CT (US); Mark Randolph Jacobson, New Milford, CT (US); Dharam Vir Vadehra, New Milford, CT (US); Regina Elaine Wedral, Sherman, CT (US)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,705

(22) Filed: Apr. 26, 1999

(51) Int. Cl.[7] .................................................. A23L 1/30
(52) U.S. Cl. .......................... 426/74; 426/573; 426/577; 426/580; 426/583
(58) Field of Search ........................... 426/74, 580, 584, 426/573, 575, 577, 583, 590

(56) References Cited

U.S. PATENT DOCUMENTS 4,906,482 A * 3/1990 Zemel et al. ................ 426/74
5,855,936 A * 1/1999 Reddy et al. ................. 426/74
6,039,986 A * 3/2000 Mallangi et al. .............. 426/74

FOREIGN PATENT DOCUMENTS

| AU | 88768 82 A | 4/1983 |
| EP | 0 832 564 A1 | 4/1998 |
| EP | 0 875 753 A2 | 11/1998 |
| GB | 446 529 A | 4/1936 |
| WO | 00/02462 A | 1/2000 |

OTHER PUBLICATIONS

Whistler et al., Industrial Gums Polysaccharides and Their Derivatives, Academic Press, New York, 1959, pp. 94–99 and 271–274.*

Je Hong Ryue, Effects of soluble calcium–to–protein ratio on age gelation of ultrafiltration or reverse osmosis concentrated, ultra–high temeperature–treated milk, Dissertation Abstracts International, B, (1995, thesis publ. 1994) 55(7) 2461.*

Potjewijd, AN 474908 FROSTI, abstracting Drink Technology and Marketing, 1998, (Jun.), 2(2), 12.*

Yazici et al, AN 443420 FROSTI, abstracting Journal of Food Science, 1997, (May–Jun.), 62, 535–538.*

* cited by examiner

*Primary Examiner*—Leslie Wong
(74) *Attorney, Agent, or Firm*—Winston & Strawn

(57) ABSTRACT

A calcium-fortified milk or dairy-based product containing a calcium source and a food-grade polyphosphate having at least six phosphate groups.

19 Claims, No Drawings

SHELF-STABLE CALCIUM FORTIFIED MILK AND DAIRY PRODUCTS

FIELD OF THE INVENTION

The present invention relates to the calcium-fortified foodstuff and more particularly to the shelf-stable milk fortified with calcium.

BACKGROUND OF THE INVENTION

Calcium is an important element in human diets for adequate bone formation and maintenance as well as other metabolic functions, e.g. nerve transmission, blood clotting, proper cell function and muscle contraction. It is common practice to fortify food products with calcium sources, which are either insoluble or soluble at around neutral pH. Many of the calcium sources currently used for fortification which are insoluble or substantially insoluble at around neutral pH, e.g. calcium carbonate, calcium phosphates, calcium citrate and other organic or inorganic acid salts of calcium, result in precipitation and a chalky mouth feel. Other calcium sources, which are soluble or substantially soluble at around neutral pH such as calcium chloride, calcium hydroxide and a few organic acid salts of calcium, react with milk proteins resulting in undesirable coagulation and gelation.

It is also common practice to stabilize or reduce the sedimentation of the calcium and milk proteins in the milk beverages fortified with calcium sources by adding guar gum, pectins and/or other gums, but such materials impart an undesirably high viscosity to milk. Protein destabilisation, e.g. gelation, coagulation and precipitation, is mainly attributed to free calcium ions in the system.

It is highly desirable to have a calcium source to fortify milk, casein or whey containing beverages and other dairy based products without coagulation, gelation and sedimentation. It is also important that these calcium-fortified products have good palatability and no bitterness or off-flavor.

Addition of calcium to liquid products, especially milk and milk beverages is very difficult. Firstly, highly soluble sources of calcium (calcium chloride, etc.) interact with milk proteins leading to their coagulation during process treatment even at pasteurization temperature. Secondly, insoluble sources of calcium will not destabilize protein micelles which however will precipitate rapidly. Thirdly, addition of calcium can change the equilibria between the free and colloidal form of calcium in milk leading to cross-linking of proteins that can cause problems due to gelation.

The major problem for shelf stable milk is age gelation. In spite of a number of detailed studies on this defect, a unifying theory on the mechanisms of age gelation has not been established. According to some evidence, proteolysis by native and/or bacterial heat resistant proteases causes the age gelation; other studies point to a mechanism involving purely physico-chemical reactions, or a combination of enzymatic and physico-chemical processes. No studies to prevent age gelation of milk or dairy products fortified with calcium have been found in the literature.

In our co-pending U.S. Ser. No. 09/113,401, now U.S. Pat. No. 6,039,986, there is claimed a fortified foodstuff comprising a fortifying amount of a balanced blend of calcium lactate and calcium carbonate stabilized with a source of glucuronic acid. This calcium-fortified milk can survive the heat treatment (pasteurization, UHT pasteurization and UHT sterilization, autoclaving) and storage at refrigerated conditions without coagulation and sedimentation for a 2-month period. No bitterness or off-flavor were found in this calcium fortified milk. However, age gelation was evident after 2–2.5 months storage at room temperature It would be highly desirable to have a shelf-stable calcium-fortified milk or dairy based product without age gelation, preferably with improved palatability.

SUMMARY OF THE INVENTION

We found that the use of food-grade polyphosphates having at least six phosphate groups, such as sodium hexametaphosphate (NaHMP), in calcium-fortified milk and dairy-based products prevents age gelation of UHT treated milk for a period of up to 6 months storage at room temperature.

According to the present invention, there is provided a calcium-fortified milk or dairy-based product comprising a calcium source and a food-grade polyphosphate having at least six phosphate groups.

DETAILED DESCRIPTION OF THE INVENTION

The calcium source may be, for example, calcium-hydrolyzed pectin, calcium-negatively charged emulsifier (e.g., citrem), calcium lactate-citrate metastable complex or a balanced blend of calcium lactate and calcium carbonate.

The amount of the blend of calcium salts present in the fortified foodstuff may be from 0.05 to 5%, preferably from 0.1 to 1%, and more preferably from 0.2 to 0.4% by weight based on the weight of the foodstuff.

In the case where a balanced blend of calcium lactate and calcium carbonate is used, a source of glucuronic acid is also present. When a balanced blend of calcium lactate and calcium carbonate is used, the weight ratio of calcium lactate to calcium carbonate may be from 1:2 to 3:1 and preferably from 1:1.7 to 1:1.9.

The food-grade polyphosphate having at least six phosphate groups may be, for instance, an alkali metal or ammonium polyphosphate which may be a cyclic polyphosphate, preferably a sodium or potassium polyphosphate. Especially preferred is sodium hexametaphosphate.

The amount of food-grade polyphosphate having at least six phosphate groups present in the fortified foodstuff should be an amount sufficient to inhibit age gelation and may be from 0.05 to 0.3%, preferably from 0.1 to 0.2%, and more preferably from 0.12 to 0.15 % by weight based on the weight of the foodstuff.

The dairy-based product may be a milk beverage, e.g., chocolate milk, or other beverages such as juices. If desired, other minerals or vitamins may be present in the foodstuff.

The source of glucuronic acid may be gum ghatti but is preferably gum arabic. The amount of gum arabic present in the fortified foodstuff may be from 0.05 to 2.5%, preferably from 0.1 to 1.0%, and more preferably from 0.2 to 0.5% by weight based on the weight of the foodstuff. Although not wishing to be bound by theory, we believe that the glucuronic acid residues in gum arabic aid in suspending calcium by ionic binding without contributing significantly to viscosity.

Advantageously, a carrageenan may be present which may be the lambda- or iota-form but is preferably kappa-carrageenan. The amount of carrageenan present in the fortified foodstuff may be from 0.005 to 0.1%, preferably from 0.01 to 0.05%, and more preferably from 0.01 to 0.03% by weight based on the weight of the foodstuff.

The ingredients can be added to the milk base individually or as a blend. The milk can then be UHT treated without any additional pre-process (e.g., adjustment of solids) and pre-heat treatment.

The fortified foodstuff comprising a fortifying amount of a balanced blend of calcium lactate and calcium together with a source of glucuronic acid may be prepared by mixing of the balanced blend of calcium lactate and calcium carbonate with the food-grade polyphosphate having at least six phosphate groups, adding a source of glucuronic acid, and adding to the foodstuff.

The balanced blend of calcium lactate and calcium carbonate and the source of glucuronic acid may be added in the form of aqueous suspensions or as dry powders.

An alkaline agent is preferably added to adjust the pH of the Calcium fortified milk to 6.8–7.0. Any food grade alkaline agent may be used for neutralization, including but not limited to sodium hydroxide, potassium hydroxide, ammonia hydroxide, magnesium hydroxide, sodium carbonate, sodium bicarbonate, potassium carbonate, and potassium bicarbonate.

Advantageously, a carrageenan may be added to the foodstuff, preferably before the balanced blend of calcium lactate and calcium carbonate (or calcium—hydrolyzed pectin or calcium—citrem or calcium lactate-citrate metastable complex) together with the food-grade polyphosphate having at least six phosphate groups is added to the foodstuff. The carrageenan may also be added to the foodstuff in the form of an aqueous suspension or as a dry powder.

If desired, the balanced blend of calcium lactate and calcium carbonate, the source of glucuronic acid, and optionally the carrageenan, and the food-grade polyphosphate having at least six phosphate groups may be mixed together and added as a powder.

It was found in our work on UHT sterilized calcium fortified skim milk aseptically filled into 133 mL glass jars, that addition of the food-grade polyphosphate having at least six phosphate groups prevented age gelation during 6 months of storage at room temperature. Results evaluation of calcium fortified skim milk (with and without addition of sodium hexametaphosphate) during the storage at room temperature are presented in the following Table:

phosphate was found to be stable, without gelation during 6 months of storage at room temperature, while samples without hexametaphosphate already became gelled after 2–2.5 months storage at room temperature.

The following Example further illustrates the present invention

EXAMPLE

Calcium Fortified Skim Milk (Ca level: 50% more than in regular skim milk)

12.0 g of kappa carrageenan and 200 g of gum Arabic are slowly added to 10 kg of skim milk in a liquifier under agitation and mixed for 5 minutes at high speed. Then 70 kg of skim milk is added to the liquifier under agitation.

61.6 g of calcium lactate pentahydrate, 100.0 g of micronized calcium carbonate, and 120.0 g of sodium hexametaphosphate are added to the milk with carrageenan and gum arabic under agitation, then speed of the liquifier is slowed down. After 10 minutes of mixing, the pH of calcium fortified milk is adjusted with 10% potassium hydroxide solution to 6.8–6.9.

The milk is preheated to 175° F., ultra high temperature (UHT) treated at 298° F. for 5 sec by steam injection, flash cooled to 175° F., and homogenized at 175° F. and a pressure of 2500/500 psi. The milk is cooled to 40° F., aseptically filled in 133 mL glass jars and stored at room temperature for 6 months.

After 6 months the product was judged by a taste panel of 5 people, who found the milk to be stable, without gelation, sedimentation or coagulation, and of good flavor.

We claim:

1. A calcium-fortified dairy milk or dairy-based product comprising a calcium source and a food-grade alkali metal or ammonium polyphosphate having at least six phosphate groups, wherein the amount of calcium salts present is greater than 0.1% to 5% by weight based on the weight of the product and the calcium source comprises at least one of a calcium-hydrolyzed pectin, calcium-citrem, calcium lactate-citrate metastable complex or a balanced blend of calcium lactate and calcium carbonate.

2. A calcium-fortified milk or dairy-based product according to claim 1, wherein the amount of the blend of calcium

|  | Storage time (month) | | | | | Storage time (month) | | | | | Storage time (month) | | |
| --- | --- | --- | --- | --- | --- | --- | --- | --- | --- | --- | --- | --- | --- |
|  | 1 | 2 | 4 | 5 | 6 | 1 | 2 | 4 | 5 | 6 | 4 | 5 | 6 |
| Composition of Ca-milk | Brookfield viscosity (cP) | | | | | visual gelation | | | | | Sediment (dry weight) | | |
| Without NaHMP | 11.3 | 16.5 | 32.5 | 52.5 | 99.1 | 1 | 7 | 10 | 10 | 10 | 0.09 | 1.39 | 5.61 |
| With NaHMP (0.075%) | 3.7 | 5.0 | 4.5 | 4.5 | 5.3 | 0 | 0 | 0 | 0 | 0 | 0.050 | 0.050 | 0.050 |
| With NaHMP (0.150%) | 5.0 | 4.5 | 6.5 | 5.4 | 5.3 | 0 | 0 | 0 | 0 | 0 | 0.040 | 0.020 | 0.020 |

*Sediment weight was determined from sediment weight after centrifugation at 1800 g for 5 min and drying of resulting pellet at room temperature overnight
**Visual gelation was observed using 0–10 score scale, where 0 corresponds to no gelation, while 10 corresponds to whole volume strong gel Therefore, no gelation (and no significant increase in viscosity) was found in Ca-milk with added sodium hexametaphosphate (NaHMP) upon the storage when compared to sample without NaHMP.

Further, no protein coagulation, salt precipitation or off-flavor was found. Similar data were obtained with calcium fortified 2% fat milk filled in 250 mL Tetra Brik® Aseptic packages (Tetra Pak Inc., Chicago) with addition of hexametaphosphate. Calcium fortified milk with added hexametasalts present in the fortified product is greater than 0.2% to 1% by weight based on the weight of the product.

3. A calcium-fortified milk or dairy-based product according to claim 1 wherein, in the case where a balanced blend of calcium lactate and calcium carbonate is used, a source of glucuronic acid is also present.

4. A calcium-fortified milk or dairy-based product according to claim 1 wherein, in the case where a balanced blend of calcium lactate and calcium carbonate is used, the weight ratio of calcium lactate to calcium carbonate is from 1:2 to 3:1.

5. A calcium-fortified milk or dairy-based product according to claim 1 wherein the amount of the food-grade polyphosphate having at least six phosphate groups present in the fortified foodstuff is from 0.05 to 0.3% by weight based on the weight of the foodstuff.

6. A calcium-fortified milk or dairy-based product according to claim 1 wherein the food-grade polyphosphate having at least six phosphate groups is sodium hexametaphosphate.

7. A calcium-fortified milk or dairy-based product according to claim 3 wherein the source of glucuronic acid is gum arabic.

8. A calcium-fortified milk or dairy-based product according to claim 7 wherein the amount of gum arabic present is from 0.05 to 2.5% by weight based on the weight of the foodstuff.

9. A calcium-fortified milk or dairy-based product according to claim 1 wherein a carrageenan may be present.

10. A calcium-fortified milk or dairy-based product according to claim 1 wherein the food-grade polyphosphate is a sodium or potassium polyphosphate.

11. The calcium fortified-milk or dairy-based product of claim 1 wherein age gelation at room temperature is prevented for up to 6 months and the milk or dairy product shows no substantial increase in viscosity for up to 6 months.

12. A process for preparing a calcium-fortified dairy milk or dairy-based product which comprises adding a calcium source and a food-grade alkali metal or ammonium polyphosphate having at least six phosphate groups to a milk base individually or as a blend, wherein the calcium source comprises at least one of a calcium-hydrolyzed pectin, calcium-citrem, calcium lactate-citrate metastable complex or a balanced blend of calcium lactate and calcium carbonate.

13. A process according to claim 12 wherein an alkaline agent is added to adjust the pH of the calcium fortified milk or dairy-based product to 6.8–7.0.

14. A process according to claim 12 wherein the food-grade polyphosphate having at least six phosphate groups is sodium hexametaphosphate.

15. A process for preparing a calcium-fortified dairy milk or dairy-based product which comprises mixing a balanced blend of calcium lactate and calcium carbonate with a food grade alkali metal or ammonium polyphosphate having at least six phosphate groups and a source of glucuronic acid to provide a supplement, and adding the supplement to a dairy milk or dairy-based product.

16. A process according to claim 15 wherein the balance blend of calcium lactate and calcium carbonate and the source of glucuronic acid are added in the form of aqueous suspensions or as dry powers.

17. A process according to claim 15 wherein the balance blend of calcium lactate and calcium carbonate, source of glucronic acid, and optionally a carrageenan, and the food-grade polyphosphate having at least six phosphate groups may be mixed together and added as a power.

18. A calcium-fortified dairy milk or dairy-based product, comprising a calcium source and ammonium polyphosphate having at least six phosphate groups.

19. The calcium-fortified milk or dairy-based product of claim 18, wherein the calcium source comprises a calcium-hydrolyzed pectin, calcium-citrem, calcium lactate-citrate metastable complex, or a balanced blend of calcium lactate and calcium carbonate.

* * * * *

UNITED STATES PATENT AND TRADEMARK OFFICE
CERTIFICATE OF CORRECTION

PATENT NO.     : 6,455,082 B1                                     Page 1 of 1
DATED          : September 24, 2002
INVENTOR(S)    : Sher et al.

It is certified that error appears in the above-identified patent and that said Letters Patent is hereby corrected as shown below:

Title page,
Item [56], References Cited, FOREIGN PATENT DOCUMENTS, change
"EP 0 875 753 A2" to -- EP 0 875 153 A2 --.
OTHER PUBLICATIONS, Je Hong Ryue publication, change "temeperature-treated" to -- temperature-treated --.

Column 6,
Line 15, change "balance" to -- balanced --.
Line 18, change "powers" to -- powders --.
Line 20, change "balance" to -- balanced --.
Line 21, before "source of", insert -- the --.
Line 22, change "glucronic" to -- glucuronic --.
Line 24, change "power" to -- powder --.

Signed and Sealed this

Fourth Day of March, 2003

JAMES E. ROGAN
*Director of the United States Patent and Trademark Office*